United States Patent [19]
Okudaira

[11]  4,330,181
[45]  May 18, 1982

[54] COMPACT ZOOM LENS

[75] Inventor: Sadao Okudaira, Ranzan, Japan

[73] Assignee: Asahi Kogaku Kogyo Kabushiki Kaisha, Tokyo, Japan

[21] Appl. No.: 167,498

[22] Filed: Jul. 11, 1980

[30] Foreign Application Priority Data

Jul. 16, 1979 [JP] Japan .................................. 54-90134

[51] Int. Cl.³ ............................................. G02B 15/16
[52] U.S. Cl. ................................................... 350/427
[58] Field of Search ................................. 350/423, 427

[56] References Cited
U.S. PATENT DOCUMENTS
4,094,586  6/1978  Sato et al. ............................ 350/427

FOREIGN PATENT DOCUMENTS
2804667  8/1978  Fed. Rep. of Germany ...... 350/427

Primary Examiner—John K. Corbin
Assistant Examiner—Scott J. Sugarman

Attorney, Agent, or Firm—Sughrue, Mion, Zinn, Macpeak and Seas

[57] ABSTRACT

A compact zoom lens covering a range from standard to telephoto and having a high zoom ratio of approximately four adapted for use with 35 mm SLR cameras. The zoom lens system includes a first convergent lens group, a divergent lens group and a second convergent lens group in that order from the object. The first convergent lens group includes three lens components including at least one negative lens component, the divergent lens group is composed of at least three lens components including at least one positive lens component while the second convergent lens group includes at least two negative and two positive lens components with the last lens component being a negative lens the surface of smaller radius of curvature of which is directed to the object. The first and second convergent lens groups may be either rigidly coupled to be movable together or movable independently from one another to vary the overall focal length of the zoom lens system.

6 Claims, 20 Drawing Figures

COMPACT ZOOM LENS

BACKGROUND OF THE INVENTION

The present invention relates to an extremely compact zoom lens covering a range from standard to telephoto photographing and having a high zoom ratio of about four and adapted for use with 35 mm SLR cameras.

Zoom lenses covering a relatively narrow range from standard to medium telephoto or from semi-telephoto to telephoto have been widely known and frequently used. A few zoom lenses covering both the above-noted two ranges, that is, from standard to telephoto with zoom ratios of more than about four have been known but such lenses are large in size in comparison with the above noted two kinds of zoom lenses and rather lacking in performance.

Accordingly, an object of the present invention is to provide a zoom lens covering a zoom range corresponding to the above-described two kinds of zoom lenses and whose configuration is as compact as those of the above-described known lenses.

SUMMARY OF THE INVENTION

In accordance with this and other objects of the invention there is provided a zoom lens system including, in order from the object side, a first convergent lens group, a divergent lens group and a second convergent lens group. The first and second convergent lens groups may either be rigidly coupled mechanically so as to be movable together to thereby change the overall focus length or mechanically independent of one another and independently movable to change the overall focal length. The first convergent lens group includes at least three lens components including at least one negative lens component. The divergent lens group is composed of at least three lens components including at least one positive lens component while the second convergent lens group includes at least two positive lens components and at least two negative lens components with the last negative lens component having the surface of smaller radius of curvature thereof directed to the object.

DESCRIPTION OF THE PREFERRED EMBODIMENTS

Figure 1:
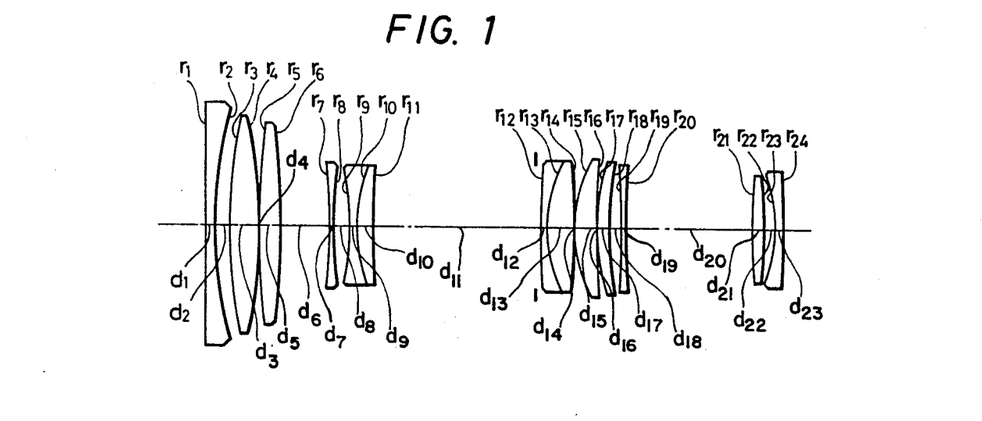
FIGS. 1, 6, 11 and 16 show lens constructions according to the present invention based on Examples 1, 2, 3 and 4 given in the specification below.
Figure 2:
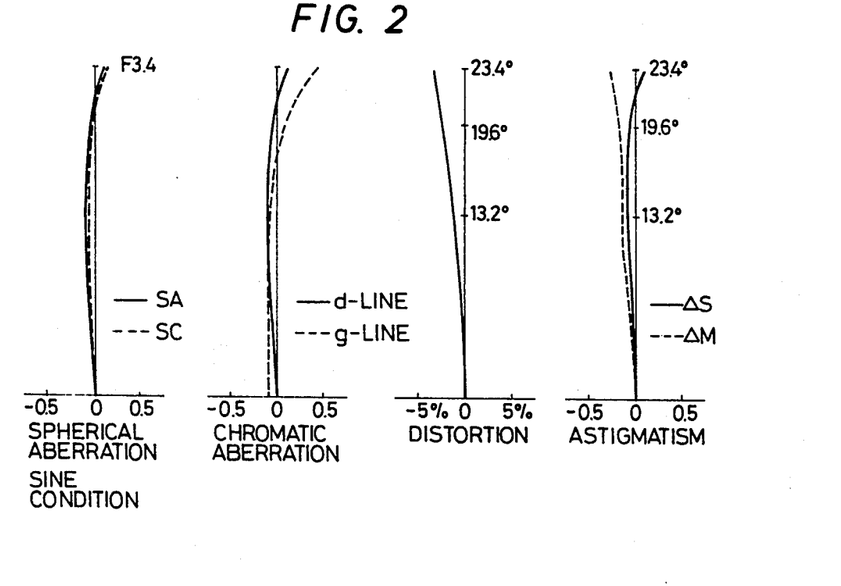
FIGS. 2 to 5 show aberration curve graphs of Example 1 at the minimum focal length, a first intermediate focal length, a second intermediate focal length and the maximum focal length, respectively.
Figure 3:
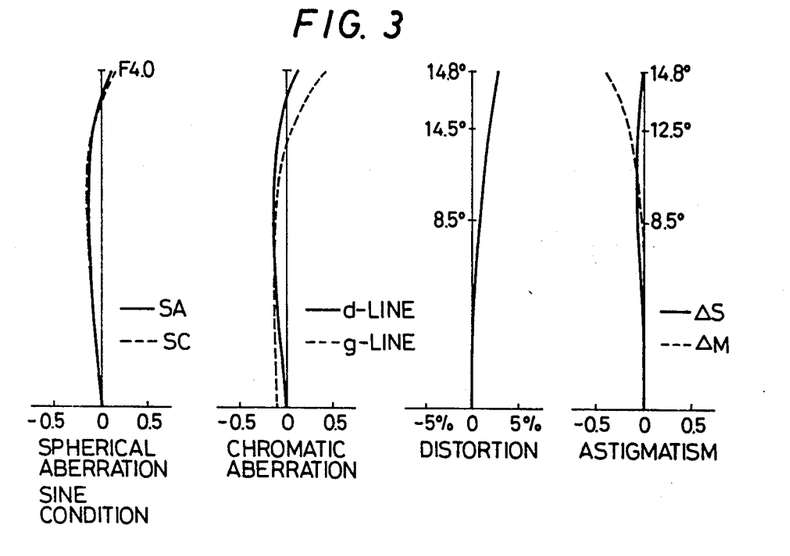
Figure 4:
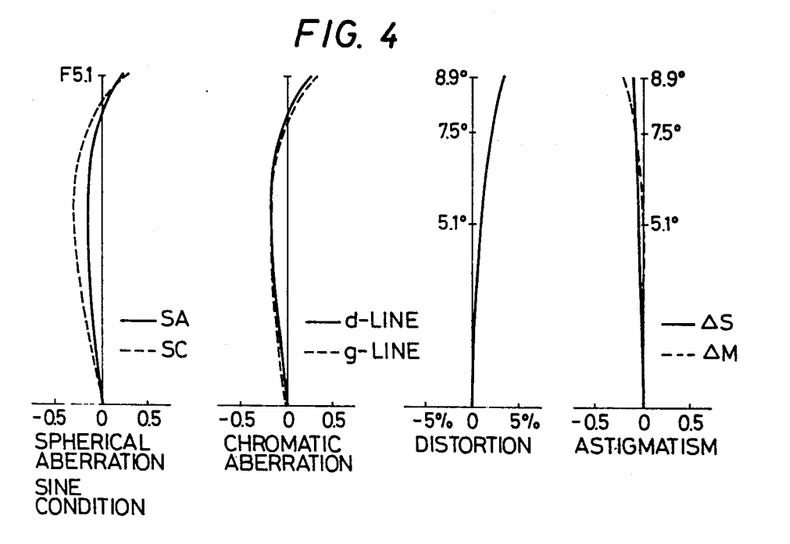
Figure 5:
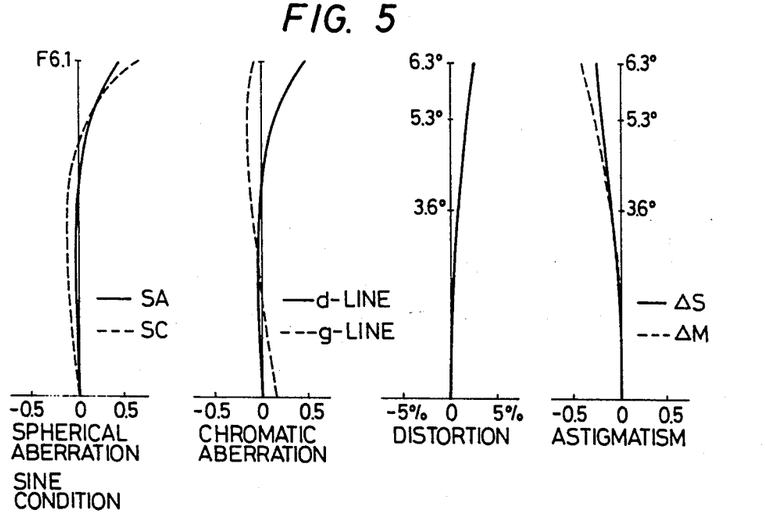
Figure 6:
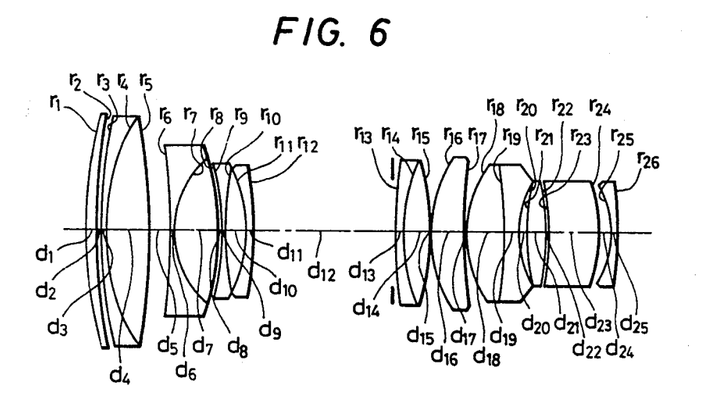
Figure 7:
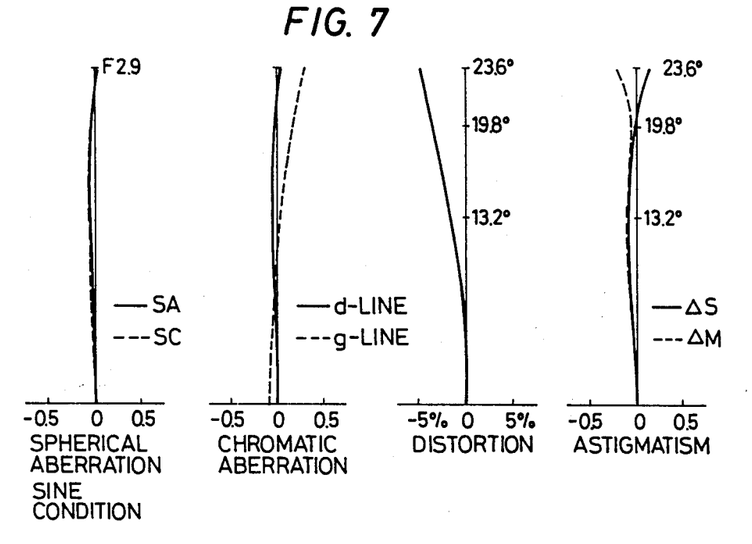
FIGS. 7 to 10 show aberration curve graphs of Example 2 at the minimum focal length, a first intermediate focal length, a second intermediate focal length and the maximum focal length, respectively.
Figure 8:
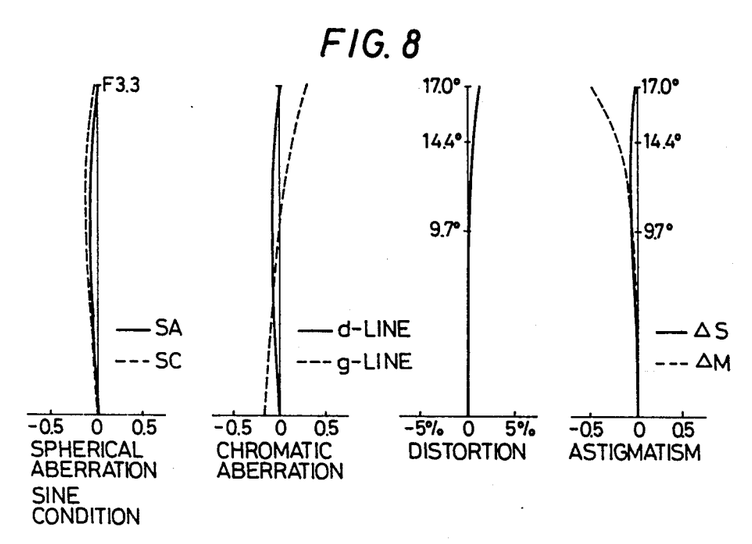
Figure 9:
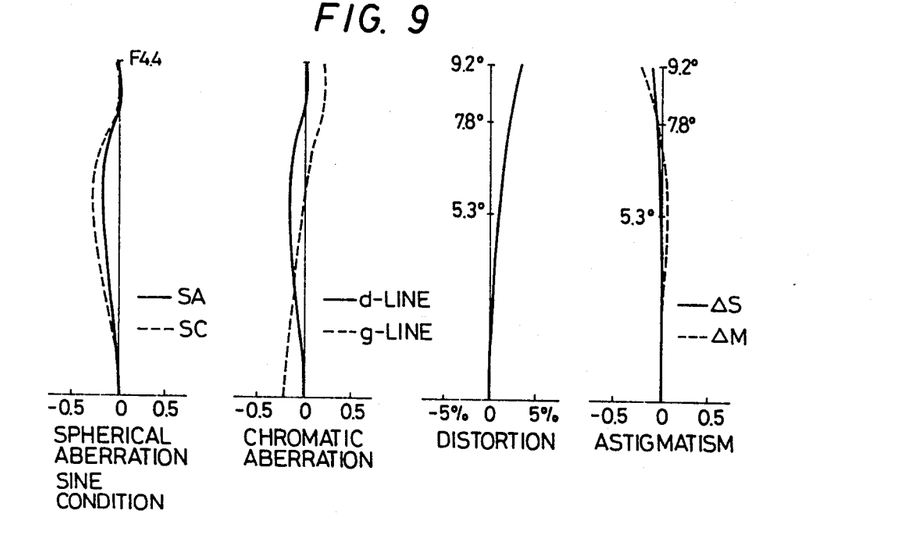
Figure 10:
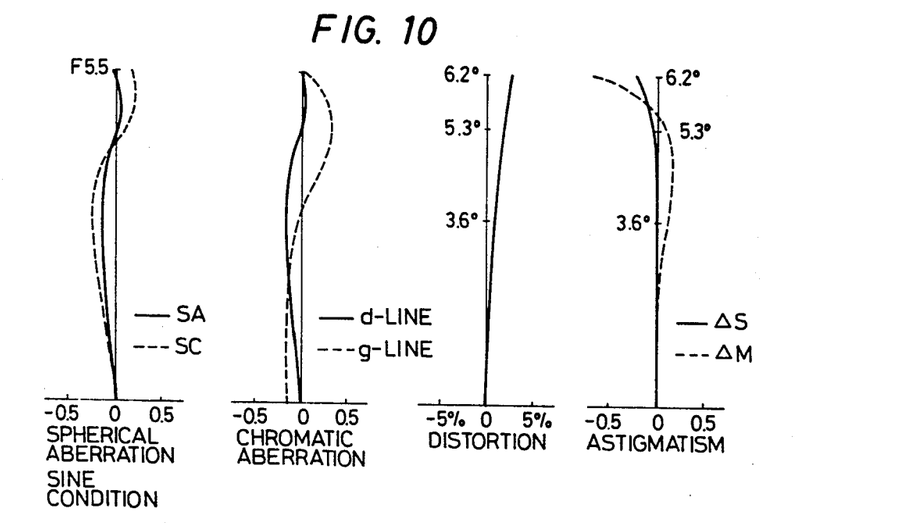
Figure 11:
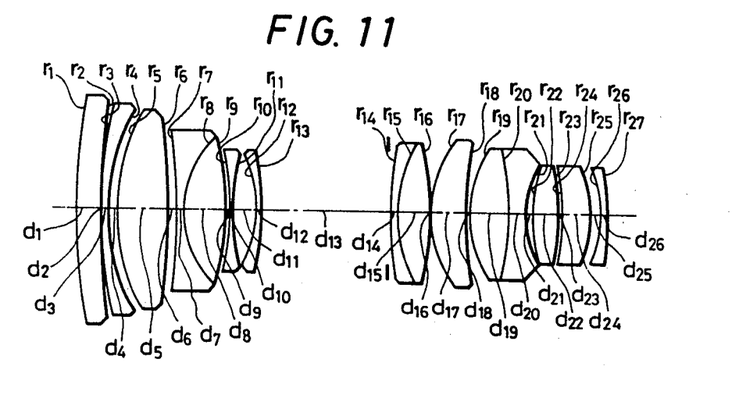
Figure 12:
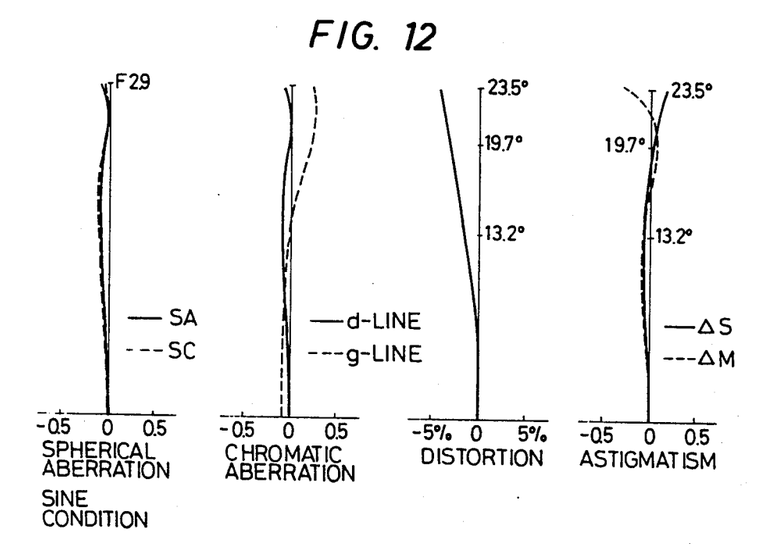
FIGS. 12 to 15 show aberration curve graphs of Example 3 at the minimum focal length, a first intermediate focal length, a second intermediate focal length and the maximum focal length, respectively.
Figure 13:
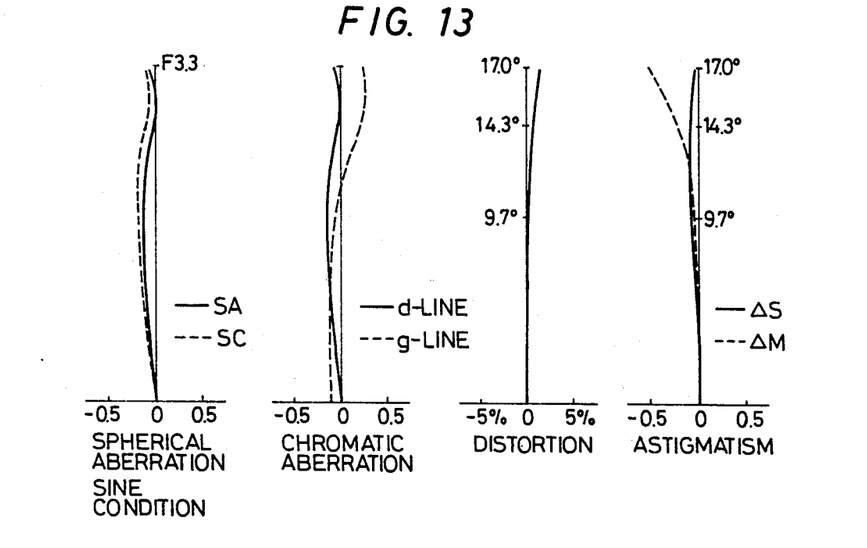
Figure 14:
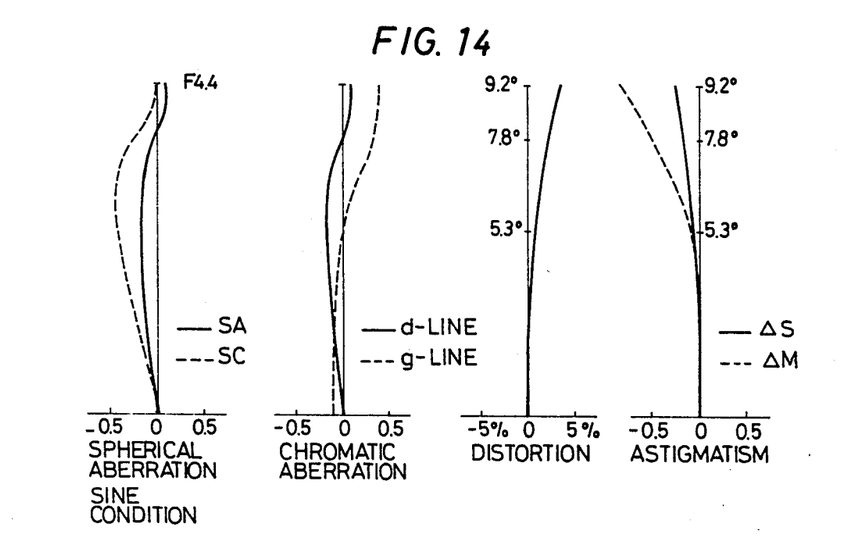
Figure 15:
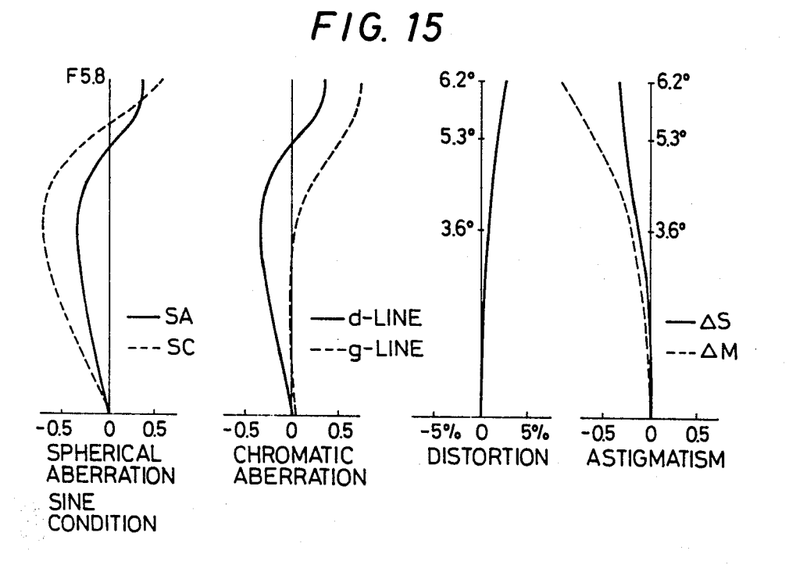
Figure 16:
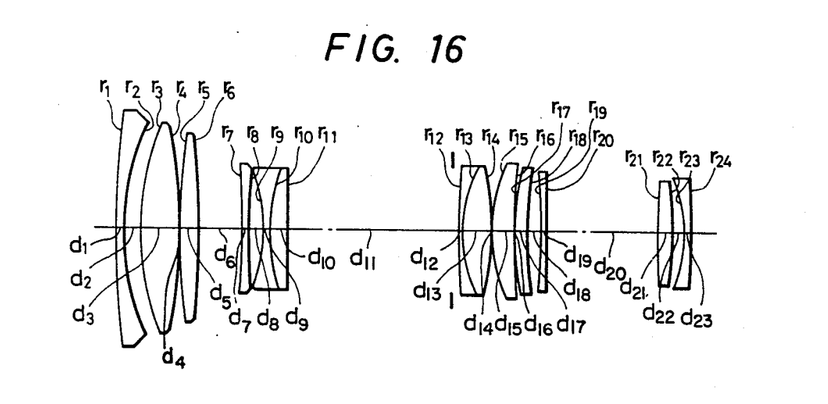
Figure 17:
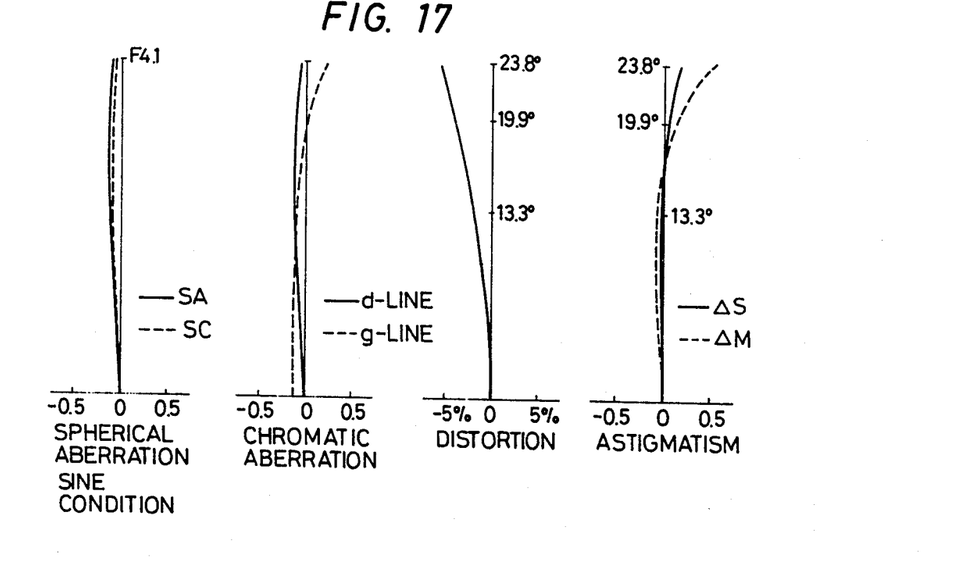
FIGS. 17 to 20 show aberration curve graphs of Example 4 at the minimum focal length, a first intermediate focal length, a second intermediate focal length and the maximum focal length, respectively.
Figure 18:
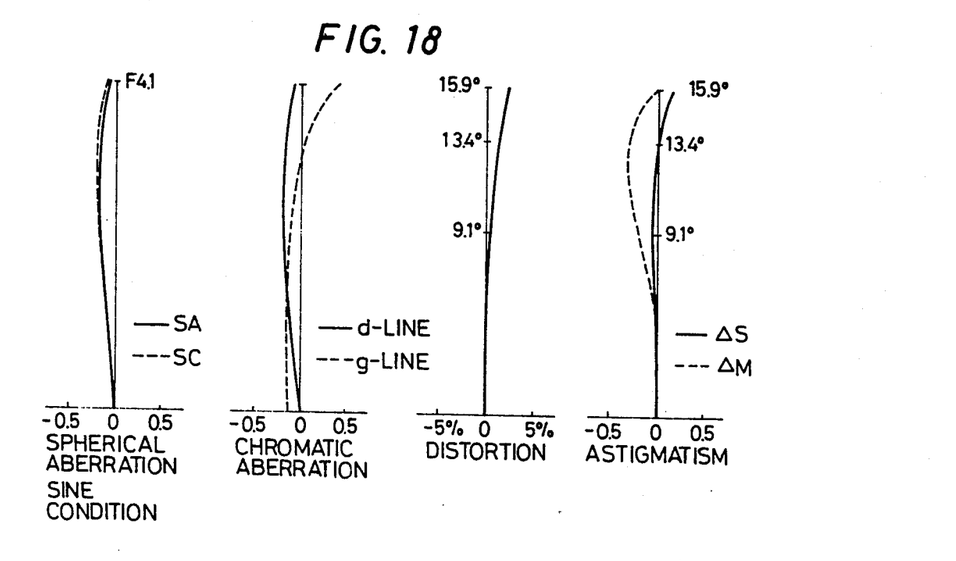
Figure 19:
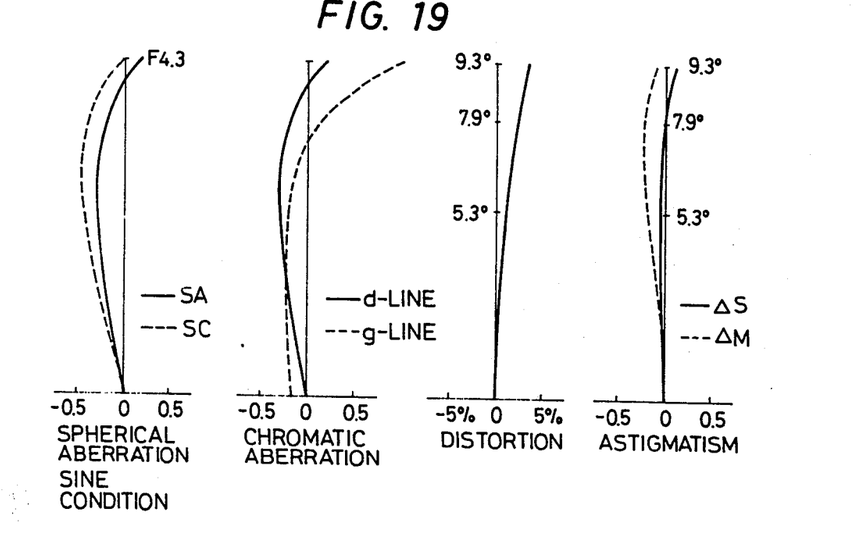
Figure 20:
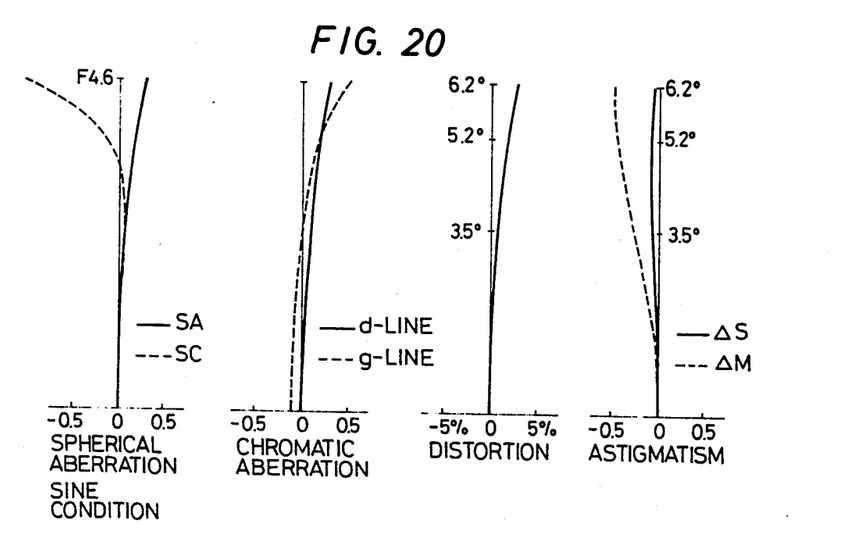

A lens construction of the present invention will now be described.

According to the present invention, a zoom lens system includes, in order from the object side, a first convergent lens group, a divergent lens group and a second convergent lens group. That is, the lens system is composed of three lens groups, the first and second convergent lens group being either rigidly coupled mechanically to be movable together to thereby change the overall focal length or mechanically independent and independently movable to thereby change the overall focal length. The first convergent lens group is composed of at least three lens components including at least one negative lens component, the divergent lens group is composed of at least three lens components including at least one positive lens component, and the second convergent lens group includes at least two positive lens components and at least two negative lens components with the last lens component being a negative lens the surface of smaller radius of curvature of which is directed to the object. The zoom lens of the invention satisfies the following conditions:

$$2.5F_s \leq f_1 \leq 3.5F_s, \quad (1)$$

$$0.55F_s \leq |f_2| \leq 1.1F_s, \; f_2 < 0, \quad (2)$$

$$0.55F_s \leq f_3 \leq 0.85F_s, \text{ and} \quad (3)$$

$$1.75 \leq N_L \quad (4)$$

where $f_1$ is the focal length of the first convergent lens group, $f_2$ is the focal length of the divergent lens group, $f_3$ is the focal length of the second convergent lens group, $F_s$ is the minimum focal length of the overall zoom lens, and $N_L$ is the refractive index of the last lens component of the second convergent lens group.

These conditions will now be explained. Condition (1) is related to the focal length of the first convergent lens group. If the focal length $f_1$ exceeds the upper limit $3.5F_s$, the overall length of the lens system is increased so that, although the various aberrations generated in the first convergent lens group are reduced, compensation for spherical aberration is difficult since light rays focused at a lower point of an image on the telephoto side are not sufficiently converged by the first convergent lens group and thereby the light rays pass through a relatively high portion of the lenses in the second convergent lens group. Inversely, when the focal length $f_1$ exceeds the lower limit $2.5F_2$, various aberrations generated in the first convergent lens group, particularly chromatic aberration generated on the telephoto side, are undesirably increased.

Condition (2) is related to the focal length of the divergent lens group which mainly functions as a variator. When $|f_2|$ of the lens group is smaller than the lower limit $0.55F_s$, it is impossible to well compensate for aberrations under the condition that only a small number of lenses be used as required by the present invention in order to well compensate for aberrations. With an increased number of lenses, the overall length and lens diameters are increased which is costly. Inversely, when $|f_2|$ is greater than the upper limit $1.1F_s$, in order to obtain a zoom ratio as required in the present invention, it is necessary to increase the amount of movement of the lens groups thereby enlarging the lens configuration.

Condition (3) is related to the focal length of the second convergent lens group. When the focal length $f_3$ is smaller than the lower limit of $0.55F_s$, it is difficult to compensate for spherical aberration on the telephoto side. Inversely, when the focal length $f_3$ exceeds the upper limit $0.85F_s$, in order to maintain the overall focal length at the wide angle end as required by the present invention, it is necessary that the distance between the divergent lens group and the second convergent lens group at the wide angle end be elongated to enlarge the overall size of the zoom lens.

Condition (4) is related to the refractive index of the last lens component of the second convergent lens group. When the refractive index is smaller than 1.75, it is difficult to compensate for comatic aberration and distortion.

Specific Examples of lens constructed according to the present invention will be described in which f is the overall focal length, $R_i$ is the radius of curvature of the i-th lens surface, $D_i$ is the lens surface interval (spacing) or the lens thickness of the i-th lens surface, and $N_i$ is the refractive index of the i-th lens at d-line, and $\nu_i$ is the Abbe number of the i-th lens.

EXAMPLE 1

| | f = 52.03 ~ 194.00 | | | FNO. 3.4 ~ 6.1 | | |
|---|---|---|---|---|---|---|
| $R_1$ | 365.980 | $D_1$ | 2.00 | $N_1$ | 1.83481 | $\nu_1$ | 42.7 |
| $R_2$ | 63.150 | $D_2$ | 3.20 | | | |
| $R_3$ | 62.650 | $D_3$ | 8.04 | $N_2$ | 1.49700 | $\nu_2$ | 81.3 |
| $R_4$ | −126.230 | $D_4$ | 0.10 | | | |
| $R_5$ | 132.321 | $D_5$ | 4.11 | $N_3$ | 1.48749 | $\nu_3$ | 70.2 |
| $R_6$ | −272.005 | $D_6$ variable (9.76 ~ 42.95) | | | | |
| $R_7$ | −210.308 | $D_7$ | 1.40 | $N_4$ | 1.77250 | $\nu_4$ | 49.6 |
| $R_8$ | 118.902 | $D_8$ | 3.10 | | | |
| $R_9$ | −44.722 | $D_9$ | 1.40 | $N_5$ | 1.75500 | $\nu_5$ | 52.3 |
| $R_{10}$ | 37.350 | $D_{10}$ | 3.80 | $N_6$ | 1.84666 | $\nu_6$ | 23.9 |
| $R_{11}$ | 784.000 | $D_{11}$ variable (35.61 ~ 2.42) | | | | |
| $R_{12}$ | 125.252 | $D_{12}$ | 1.40 | $N_7$ | 1.63980 | $\nu_7$ | 34.5 |
| $R_{13}$ | 30.750 | $D_{13}$ | 5.51 | $N_8$ | 1.49700 | $\nu_8$ | 81.3 |
| $R_{14}$ | −87.527 | $D_{14}$ | 0.10 | | | |
| $R_{15}$ | 29.210 | $D_{15}$ | 5.21 | $N_9$ | 1.61800 | $\nu_9$ | 63.4 |
| $R_{16}$ | 142.289 | $D_{16}$ | 0.20 | | | |
| $R_{17}$ | 58.125 | $D_{17}$ | 2.57 | $N_{10}$ | 1.61800 | $\nu_{10}$ | 63.4 |
| $R_{18}$ | 102.077 | $D_{18}$ | 2.60 | | | |
| $R_{19}$ | −160.000 | $D_{19}$ | 1.50 | $N_{11}$ | 1.84666 | $\nu_{11}$ | 23.9 |
| $R_{20}$ | −700.000 | $D_{20}$ | 24.13 | | | |
| $R_{21}$ | 111.400 | $D_{21}$ | 3.29 | $N_{12}$ | 1.83400 | $\nu_{12}$ | 37.2 |
| $R_{22}$ | −66.300 | $D_{22}$ | 2.64 | | | |
| $R_{23}$ | −23.370 | $D_{23}$ | 1.50 | $N_{13}$ | 1.88300 | $\nu_{13}$ | 40.8 |
| $R_{24}$ | −111.400 | | | | | |

| f | 52.03 | 80 | 135 | 194 |
|---|---|---|---|---|
| $D_6$ | 9.76 | 22.67 | 35.47 | 42.95 |
| $D_{11}$ | 35.61 | 22.70 | 9.90 | 2.42 |

$f_1 = 2.70F_s$  $|f_2| = 0.732F_s$
$f_3 = 0.751F_s$  $N_L = 1.88300$

EXAMPLE 2

| | f = 52.01 ~ 194.00 | | FNO. 2.9 ~ 5.5 | | | |
|---|---|---|---|---|---|---|
| $R_1$ | 90.698 | $D_1$ | 2.89 | $N_1$ | 1.48749 | $\nu_1$ | 70.1 |
| $R_2$ | 145.567 | $D_2$ | 0.10 | | | |
| $R_3$ | 120.944 | $D_3$ | 1.20 | $N_2$ | 1.63980 | $\nu_2$ | 34.6 |
| $R_4$ | 43.381 | $D_4$ | 9.73 | $N_3$ | 1.48749 | $\nu_3$ | 70.1 |
| $R_5$ | −138.370 | $D_5$ variable (3.80 ~ 31.42) | | | | |
| $R_6$ | −201.499 | $D_6$ | 1.20 | $N_4$ | 1.61800 | $\nu_4$ | 63.4 |
| $R_7$ | 19.335 | $D_7$ | 9.58 | $N_5$ | 1.63980 | $\nu_5$ | 34.6 |
| $R_8$ | −64.384 | $D_8$ | 0.12 | | | |
| $R_9$ | −75.274 | $D_9$ | 1.30 | $N_6$ | 1.77250 | $\nu_6$ | 49.6 |
| $R_{10}$ | 63.620 | $D_{10}$ | 4.15 | | | |
| $R_{11}$ | −31.785 | $D_{11}$ | 1.11 | $N_7$ | 1.62230 | $\nu_7$ | 53.2 |
| $R_{12}$ | −112.736 | $D_{12}$ variable (30.96 ~ 3.33) | | | | |
| $R_{13}$ | 175.956 | $D_{13}$ | 1.20 | $N_8$ | 1.76180 | $\nu_8$ | 27.1 |
| $R_{14}$ | 32.036 | $D_{14}$ | 5.58 | $N_9$ | 1.61800 | $\nu_9$ | 63.4 |
| $R_{15}$ | −82.062 | $D_{15}$ | 0.14 | | | |
| $R_{16}$ | 25.263 | $D_{16}$ | 7.66 | $N_{10}$ | 1.61800 | $\nu_{10}$ | 63.4 |
| $R_{17}$ | 127.432 | $D_{17}$ | 0.08 | | | |
| $R_{18}$ | 22.961 | $D_{18}$ | 8.38 | $N_{11}$ | 1.48749 | $\nu_{11}$ | 70.1 |
| $R_{19}$ | −75.531 | $D_{19}$ | 2.86 | $N_{12}$ | 1.81600 | $\nu_{12}$ | 46.8 |
| $R_{20}$ | 19.243 | $D_{20}$ | 1.92 | | | |
| $R_{21}$ | 40.710 | $D_{21}$ | 4.46 | $N_{13}$ | 1.72825 | $\nu_{13}$ | 28.5 |
| $R_{22}$ | −61.155 | $D_{22}$ | 0.10 | | | |
| $R_{23}$ | −57.625 | $D_{23}$ | 11.29 | $N_{14}$ | 1.81600 | $\nu_{14}$ | 46.8 |
| $R_{24}$ | −28.277 | $D_{24}$ | 2.14 | | | |
| $R_{25}$ | −19.412 | $D_{25}$ | 1.20 | $N_{15}$ | 1.88300 | $\nu_{15}$ | 41.0 |
| $R_{26}$ | −106.468 | | | | | |

| f | 52.01 | 70.00 | 130.00 | 194.00 |
|---|---|---|---|---|
| $D_5$ | 3.80 | 11.59 | 24.71 | 31.42 |
| $D_{12}$ | 30.96 | 23.16 | 10.04 | 3.33 |

$f_1 = 2.66F_s$  $|f_2| = 0.65F_s$
$f_3 = 0.65F_s$  $N_L = 1.88300$

EXAMPLE 3

| | f = 52.01 ~ 194.00 | | FNO. 2.9 ~ 5.8 | | | |
|---|---|---|---|---|---|---|
| $R_1$ | 106.463 | $D_1$ | 5.73 | $N_1$ | 1.48749 | $\nu_1$ | 70.1 |
| $R_2$ | 232.301 | $D_2$ | 0.10 | | | |
| $R_3$ | 125.510 | $D_3$ | 1.60 | $N_2$ | 1.64769 | $\nu_2$ | 33.8 |
| $R_4$ | 43.622 | $D_4$ | 1.61 | | | |
| $R_5$ | 43.955 | $D_5$ | 10.52 | $N_3$ | 1.48749 | $\nu_3$ | 70.1 |
| $R_6$ | −128.260 | $D_6$ variable (1.77 ~ 27.68) | | | | |
| $R_7$ | −151.637 | $D_7$ | 1.40 | $N_4$ | 1.64000 | $\nu_4$ | 60.2 |
| $R_8$ | 20.251 | $D_8$ | 9.64 | $N_5$ | 1.64769 | $\nu_5$ | 33.8 |
| $R_9$ | −57.769 | $D_9$ | 0.10 | | | |
| $R_{10}$ | −82.471 | $D_{10}$ | 1.30 | $N_6$ | 1.77250 | $\nu_6$ | 49.6 |
| $R_{11}$ | 65.005 | $D_{11}$ | 4.40 | | | |
| $R_{12}$ | −28.276 | $D_{12}$ | 1.30 | $N_7$ | 1.61720 | $\nu_7$ | 54.0 |
| $R_{13}$ | −94.640 | $D_{13}$ variable (27.44 ~ 1.52) | | | | |
| $R_{14}$ | 181.414 | $D_{14}$ | 1.20 | $N_8$ | 1.76180 | $\nu_8$ | 27.1 |
| $R_{15}$ | 30.521 | $D_{15}$ | 6.20 | $N_9$ | 1.64000 | $\nu_9$ | 60.2 |
| $R_{16}$ | −81.897 | $D_{16}$ | 0.14 | | | |
| $R_{17}$ | 25.123 | $D_{17}$ | 7.98 | $N_{10}$ | 1.64000 | $\nu_{10}$ | 60.2 |
| $R_{18}$ | 111.479 | $D_{18}$ | 0.10 | | | |
| $R_{19}$ | 23.363 | $D_{19}$ | 8.41 | $N_{11}$ | 1.48749 | $\nu_{11}$ | 70.1 |
| $R_{20}$ | −69.850 | $D_{20}$ | 3.43 | $N_{12}$ | 1.81600 | $\nu_{12}$ | 46.8 |
| $R_{21}$ | 19.018 | $D_{21}$ | 2.15 | | | |
| $R_{22}$ | 38.478 | $D_{22}$ | 5.35 | $N_{13}$ | 1.71736 | $\nu_{13}$ | 29.5 |
| $R_{23}$ | −62.200 | $D_{23}$ | 0.27 | | | |
| $R_{24}$ | −59.154 | $D_{24}$ | 6.61 | $N_{14}$ | 1.81600 | $\nu_{14}$ | 46.8 |
| $R_{25}$ | −27.907 | $D_{25}$ | 2.15 | | | |
| $R_{26}$ | −18.890 | $D_{26}$ | 1.20 | $N_{15}$ | 1.88300 | $\nu_{15}$ | 41.0 |
| $R_{27}$ | −100.511 | | | | | |

| f | 52.01 | 70.00 | 130.00 | 194.00 |
|---|---|---|---|---|
| $D_6$ | 1.77 | 9.06 | 21.36 | 27.68 |
| $D_{13}$ | 27.44 | 20.14 | 7.84 | 1.52 |

$f_1 = 2.50F_s$  $|f_2| = 0.63F_s$
$f_3 = 0.63F_s$  $N_L = 1.88300$

EXAMPLE 4

| | f = 51.92 ~ 194.16 | | FNO. 4.1 ~ 4.6 | | | |
|---|---|---|---|---|---|---|
| $R_1$ | 1424.543 | $D_1$ | 2.00 | $N_1$ | 1.83400 | $\nu_1$ | 37.2 |
| $R_2$ | 91.344 | $D_2$ | 3.23 | | | |
| $R_3$ | 108.199 | $D_3$ | 6.60 | $N_2$ | 1.48749 | $\nu_2$ | 70.1 |
| $R_4$ | −130.636 | $D_4$ | 0.10 | | | |
| $R_5$ | 114.625 | $D_5$ | 4.90 | $N_3$ | 1.48749 | $\nu_3$ | 70.1 |
| $R_6$ | −198.474 | $D_6$ variable (4.26 ~ 46.26) | | | | |
| $R_7$ | −191.827 | $D_7$ | 1.40 | $N_4$ | 1.77250 | $\nu_4$ | 49.6 |
| $R_8$ | 106.316 | $D_8$ | 4.36 | | | |
| $R_9$ | −49.308 | $D_9$ | 1.40 | $N_5$ | 1.78800 | $\nu_5$ | 47.4 |
| $R_{10}$ | 35.107 | $D_{10}$ | 5.75 | $N_6$ | 1.84666 | $\nu_6$ | 23.9 |

-continued

| | | | | | | |
|---|---|---|---|---|---|---|
| $R_{11}$ | −16518.160 | $D_{11}$ | variable (35.03 ~ 3.20) | | | |
| $R_{12}$ | 94.828 | $D_{12}$ | 1.40 | $N_7$ 1.63980 | $\nu_7$ | 34.5 |
| $R_{13}$ | 28.555 | $D_{13}$ | 10.46 | $N_8$ 1.49700 | $\nu_8$ | 81.3 |
| $R_{14}$ | −85.070 | $D_{14}$ | 0.10 | | | |
| $R_{15}$ | 28.669 | $D_{15}$ | 7.54 | $N_9$ 1.68100 | $\nu_9$ | 63.4 |
| $R_{16}$ | 91.643 | $D_{16}$ | 0.20 | | | |
| $R_{17}$ | 55.099 | $D_{17}$ | 2.86 | $N_{10}$ 1.64000 | $\nu_{10}$ | 60.1 |
| $R_{18}$ | 74.395 | $D_{18}$ | 3.48 | | | |
| $R_{19}$ | −297.878 | $D_{19}$ | 1.80 | $N_{11}$ 1.84666 | $\nu_{11}$ | 23.9 |
| $R_{20}$ | 509.166 | $D_{20}$ | 23.62 | | | |
| $R_{21}$ | 45.494 | $D_{21}$ | 4.34 | $N_{12}$ 1.83400 | $\nu_{12}$ | 37.2 |
| $R_{22}$ | −138.486 | $D_{22}$ | 2.38 | | | |
| $R_{23}$ | −27.219 | $D_{23}$ | 1.50 | $N_{13}$ 1.88300 | $\nu_{13}$ | 40.8 |
| $R_{24}$ | 334.498 | | | | | |

| | | | | |
|---|---|---|---|---|
| f | 51.92 | 74.68 | 128.04 | 194.16 |
| $D_6$ | 4.26 | 19.92 | 35.67 | 46.26 |
| $D_{11}$ | 35.03 | 25.25 | 12.05 | 3.20 |

| | |
|---|---|
| $f_1 = 2.77 F_s$ | $|f_2| = 0.73 F_s$ |
| $f_3 = 0.76 F_s$ | $N_L = 1.88300$ |

What is claimed is:

1. A zoom lens system comprising, in order from the object side, a first convergent lens group, a divergent lens group and a second convergent lens group; said first convergent lens group comprising at least three lenses including at least one negative lens component; said divergent lens group comprising at least three lens components including at least one positive lens component; said second convergent lens group comprising at least two positive lens components and at least two negative lens components with the last lens component being a negative lens the surface of smaller radius of curvature of which is directed to the object; said zoom lens satisfying:

| f = 52.03 ~ 194.00 | | | | FNO. 3.4 ~ 6.1 | | |
|---|---|---|---|---|---|---|
| $R_1$ | 365.980 | $D_1$ | 2.00 | $N_1$ 1.83481 | $\nu_1$ | 42.7 |
| $R_2$ | 63.150 | $D_2$ | 3.20 | | | |
| $R_3$ | 62.650 | $D_3$ | 8.04 | $N_2$ 1.49700 | $\nu_2$ | 81.3 |
| $R_4$ | −126.230 | $D_4$ | 0.10 | | | |
| $R_5$ | 132.321 | $D_5$ | 4.11 | $N_3$ 1.48749 | $\nu_3$ | 70.2 |
| $R_6$ | −272.005 | $D_6$ | variable (9.76 ~ 42.95) | | | |
| $R_7$ | −210.308 | $D_7$ | 1.40 | $N_4$ 1.77250 | $\nu_4$ | 49.6 |
| $R_8$ | 118.902 | $D_8$ | 3.10 | | | |
| $R_9$ | −44.722 | $D_9$ | 1.40 | $N_5$ 1.75500 | $\nu_5$ | 52.3 |
| $R_{10}$ | 37.350 | $D_{10}$ | 3.80 | $N_6$ 1.84666 | $\nu_6$ | 23.9 |
| $R_{11}$ | 784.000 | $D_{11}$ | variable (35.61 ~ 2.42) | | | |
| $R_{12}$ | 125.252 | $D_{12}$ | 1.40 | $N_7$ 1.63980 | $\nu_7$ | 34.5 |
| $R_{13}$ | 30.750 | $D_{13}$ | 5.51 | $N_8$ 1.49700 | $\nu_8$ | 81.3 |
| $R_{14}$ | −87.527 | $D_{14}$ | 0.10 | | | |
| $R_{15}$ | 29.210 | $D_{15}$ | 5.21 | $N_9$ 1.61800 | $\nu_9$ | 63.4 |
| $R_{16}$ | 142.289 | $D_{16}$ | 0.20 | | | |
| $R_{17}$ | 58.125 | $D_{17}$ | 2.57 | $N_{10}$ 1.61800 | $\nu_{10}$ | 63.4 |
| $R_{18}$ | 102.077 | $D_{18}$ | 2.60 | | | |
| $R_{19}$ | −160.000 | $D_{19}$ | 1.50 | $N_{11}$ 1.84666 | $\nu_{11}$ | 23.9 |
| $R_{20}$ | −700.000 | $D_{20}$ | 24.13 | | | |
| $R_{21}$ | 111.400 | $D_{21}$ | 3.29 | $N_{12}$ 1.83400 | $\nu_{12}$ | 37.2 |
| $R_{22}$ | −66.300 | $D_{22}$ | 2.64 | | | |
| $R_{23}$ | −23.370 | $D_{23}$ | 1.50 | $N_{13}$ 1.88300 | $\nu_{13}$ | 40.8 |
| $R_{24}$ | −111.400 | | | | | |

| | | | | |
|---|---|---|---|---|
| f | 52.03 | 80 | 135 | 194 |
| $D_6$ | 9.76 | 22.67 | 35.47 | 42.95 |
| $D_{11}$ | 35.61 | 22.70 | 9.90 | 2.42 |

| | |
|---|---|
| $f_1 = 2.70 F_s$ | $|f_2| = 0.732 F_s$ |
| $f_3 = 0.751 F_s$ | $N_L = 1.88300$ | where f is the overall focal length, $R_i$ is the radius of curvature of the i-th lens surface, $D_i$ is the lens surface interval or lens thickness of the i-th lens surface, $N_i$ is the refractive index of the i-th lens at the d-line, and $\nu_i$ is the Abbe number of the i-th lens.

2. A zoom lens system comprising, in order from the object side, a first convergent lens group, a divergent lens group and a second convergent lens group; said first convergent lens group comprising at least three lenses including at least one negative lens component; said divergent lens group comprising at least three lens components including at least one positive lens component; said second convergent lens group comprising at least two positive lens components and at least two negative lens components with the last lens component being a negative lens the surface of smaller radius of curvature of which is directed to the object; said zoom lens satisfying:

| f = 52.01 ~ 194.00 | | | | FNO. 2.9 ~ 5.5 | | |
|---|---|---|---|---|---|---|
| $R_1$ | 90.698 | $D_1$ | 2.89 | $N_1$ 1.48749 | $\nu_1$ | 70.1 |
| $R_2$ | 145.567 | $D_2$ | 0.10 | | | |
| $R_3$ | 120.944 | $D_3$ | 1.20 | $N_2$ 1.63980 | $\nu_2$ | 34.6 |
| $R_4$ | 43.381 | $D_4$ | 9.73 | $N_3$ 1.48749 | $\nu_3$ | 70.1 |
| $R_5$ | −138.370 | $D_5$ | variable (3.80 ~ 31.42) | | | |
| $R_6$ | −201.499 | $D_6$ | 1.20 | $N_4$ 1.61800 | $\nu_4$ | 63.4 |
| $R_7$ | 19.335 | $D_7$ | 9.58 | $N_5$ 1.63980 | $\nu_5$ | 34.6 |
| $R_8$ | −64.384 | $D_8$ | 0.12 | | | |
| $R_9$ | −75.274 | $D_9$ | 1.30 | $N_6$ 1.77250 | $\nu_6$ | 49.6 |
| $R_{10}$ | 63.620 | $D_{10}$ | 4.15 | | | |
| $R_{11}$ | −31.785 | $D_{11}$ | 1.11 | $N_7$ 1.62230 | $\nu_7$ | 53.2 |
| $R_{12}$ | −112.736 | $D_{12}$ | variable (30.96 ~ 3.33) | | | |
| $R_{13}$ | 175.956 | $D_{13}$ | 1.20 | $N_8$ 1.76180 | $\nu_8$ | 27.1 |
| $R_{14}$ | 32.036 | $D_{14}$ | 5.58 | $N_9$ 1.61800 | $\nu_9$ | 63.4 |
| $R_{15}$ | −82.062 | $D_{15}$ | 0.14 | | | |
| $R_{16}$ | 25.263 | $D_{16}$ | 7.66 | $N_{10}$ 1.61800 | $\nu_{10}$ | 63.4 |
| $R_{17}$ | 127.432 | $D_{17}$ | 0.08 | | | |
| $R_{18}$ | 22.961 | $D_{18}$ | 8.38 | $N_{11}$ 1.48749 | $\nu_{11}$ | 70.1 |
| $R_{19}$ | −75.531 | $D_{19}$ | 2.86 | $N_{12}$ 1.81600 | $\nu_{12}$ | 46.8 |
| $R_{20}$ | 19.243 | $D_{20}$ | 1.92 | | | |
| $R_{21}$ | 40.710 | $D_{21}$ | 4.46 | $N_{13}$ 1.72825 | $\nu_{13}$ | 28.5 |
| $R_{22}$ | −61.155 | $D_{22}$ | 0.10 | | | |
| $R_{23}$ | −57.625 | $D_{23}$ | 11.29 | $N_{14}$ 1.81600 | $\nu_{14}$ | 46.8 |
| $R_{24}$ | −28.277 | $D_{24}$ | 2.14 | | | |
| $R_{25}$ | −19.412 | $D_{25}$ | 1.20 | $N_{15}$ 1.88300 | $\nu_{15}$ | 41.0 |
| $R_{26}$ | −106.468 | | | | | |

| | | | | |
|---|---|---|---|---|
| f | 52.01 | 70.00 | 130.00 | 194.00 |
| $D_5$ | 3.80 | 11.59 | 24.71 | 31.42 |
| $D_{12}$ | 30.96 | 23.16 | 10.04 | 3.33 |

| | |
|---|---|
| $f_1 = 2.66 F_s$ | $|f_2| = 0.65 F_s$ |
| $f_3 = 0.65 F_s$ | $N_L = 1.88300$ | where f is the overall focal length, $R_i$ is the radius of curvature of the i-th lens surface, $D_i$ is the lens surface interval or lens thickness of the i-th lens surface, $N_i$ is the refractive index of the i-th lens at the d-line, $\nu_i$ is the Abbe number of the i-th lens.

3. A zoom lens system comprising, in order from the object side, a first convergent lens group, a divergent lens group and a second convergent lens group; said first convergent lens group comprising at least three lenses including at least one negative lens component; said divergent lens group comprising at least three lens components including at least one positive lens component; said second convergent lens group comprising at least two positive lens components and at least two negative lens components with the last lens component being a negative lens the surface of smaller radius of curvature of which is directed to the object; said zoom lens satisfying:

| f = 52.01 ~ 194.00 | | | | FNO. 2.9 ~ 5.8 | | |
|---|---|---|---|---|---|---|
| $R_1$ | 106.463 | $D_1$ | 5.73 | $N_1$ 1.48749 | $\nu_1$ | 70.1 |
| $R_2$ | 232.301 | $D_2$ | 0.10 | | | |
| $R_3$ | 125.510 | $D_3$ | 1.60 | $N_2$ 1.64769 | $\nu_2$ | 33.8 |

-continued

| | | | | | | | |
|---|---|---|---|---|---|---|---|
| $R_4$ | 43.622 | $D_4$ | 1.61 | | | | |
| $R_5$ | 43.955 | $D_5$ | 10.52 | $N_3$ | 1.48749 | $\nu_3$ | 70.1 |
| $R_6$ | −128.260 | $D_6$ | variable (1.77 ~ 27.68) | | | | |
| $R_7$ | −151.637 | $D_7$ | 1.40 | $N_4$ | 1.64000 | $\nu_4$ | 60.2 |
| $R_8$ | 20.251 | $D_8$ | 9.64 | $N_5$ | 1.64769 | $\nu_5$ | 33.8 |
| $R_9$ | −57.769 | $D_9$ | 0.10 | | | | |
| $R_{10}$ | −82.471 | $D_{10}$ | 1.30 | $N_6$ | 1.77250 | $\nu_6$ | 49.6 |
| $R_{11}$ | 65.005 | $D_{11}$ | 4.40 | | | | |
| $R_{12}$ | −28.276 | $D_{12}$ | 1.30 | $N_7$ | 1.61720 | $\nu_7$ | 54.0 |
| $R_{13}$ | −94.640 | $D_{13}$ | variable (27.44 ~ 1.52) | | | | |
| $R_{14}$ | 181.414 | $D_{14}$ | 1.20 | $N_8$ | 1.76180 | $\nu_8$ | 27.1 |
| $R_{15}$ | 30.521 | $D_{15}$ | 6.20 | $N_9$ | 1.64000 | $\nu_9$ | 60.2 |
| $R_{16}$ | −81.897 | $D_{16}$ | 0.14 | | | | |
| $R_{17}$ | 25.123 | $D_{17}$ | 7.98 | $N_{10}$ | 1.64000 | $\nu_{10}$ | 60.2 |
| $R_{18}$ | 111.479 | $D_{18}$ | 0.10 | | | | |
| $R_{19}$ | 23.363 | $D_{19}$ | 8.41 | $N_{11}$ | 1.48749 | $\nu_{11}$ | 70.1 |
| $R_{20}$ | −69.850 | $D_{20}$ | 3.43 | $N_{12}$ | 1.81600 | $\nu_{12}$ | 46.8 |
| $R_{21}$ | 19.018 | $D_{21}$ | 2.15 | | | | |
| $R_{22}$ | 38.478 | $D_{22}$ | 5.35 | $N_{13}$ | 1.71736 | $\nu_{13}$ | 29.5 |
| $R_{23}$ | −62.200 | $D_{23}$ | 0.27 | | | | |
| $R_{24}$ | −59.154 | $D_{24}$ | 6.61 | $N_{14}$ | 1.81600 | $\nu_{14}$ | 46.8 |
| $R_{25}$ | −27.907 | $D_{25}$ | 2.15 | | | | |
| $R_{26}$ | −18.890 | $D_{26}$ | 1.20 | $N_{15}$ | 1.88300 | $\nu_{15}$ | 41.0 |
| $R_{27}$ | −100.511 | | | | | | |

| | | | | |
|---|---|---|---|---|
| f | 52.01 | 70.00 | 130.00 | 194.00 |
| $D_6$ | 1.77 | 9.06 | 21.36 | 27.68 |
| $D_{13}$ | 27.44 | 20.14 | 7.84 | 1.52 |

$f_1 = 2.50 F_s$  $|f_2| = 0.63 F_s$
$f_3 = 0.63 F_s$  $N_L = 1.88300$ where f is the overall focal length, $R_i$ is the radius of curvature of the i-th lens surface, $D_i$ is the lens surface interval or lens thickness of the i-th lens surface, $N_i$ is the refractive index of the i-th lens at the d-line, and $\nu_i$ is the Abbe number of the i-th lens.

4. A zoom lens system comprising, in order from the object side, a first convergent lens group, a divergent lens group and a second convergent lens group; said first convergent lens group comprising at least three lenses including at least one negative lens component; said divergent lens group comprising at least three lens components including at least one positive lens component; said second convergent lens group comprising at least two positive lens components and at least two negative lens components with the last lens component being a negative lens the surface of smaller radius of curvature of which is directed to the object; said zoom lens satisfying:

f = 51.92 ~ 194.16   FNO. 4.1 ~ 4.6

| | | | | | | | |
|---|---|---|---|---|---|---|---|
| $R_1$ | 1424.543 | $D_1$ | 2.00 | $N_1$ | 1.83400 | $\nu_1$ | 37.2 |
| $R_2$ | 91.344 | $D_2$ | 3.23 | | | | |
| $R_3$ | 108.199 | $D_3$ | 6.60 | $N_2$ | 1.48749 | $\nu_2$ | 70.1 |
| $R_4$ | −130.636 | $D_4$ | 0.10 | | | | |
| $R_5$ | 114.625 | $D_5$ | 4.90 | $N_3$ | 1.48749 | $\nu_3$ | 70.1 |
| $R_6$ | −198.474 | $D_6$ | variable (4.26 ~ 46.26) | | | | |
| $R_7$ | −191.827 | $D_7$ | 1.40 | $N_4$ | 1.77250 | $\nu_4$ | 49.6 |
| $R_8$ | 106.316 | $D_8$ | 4.36 | | | | |
| $R_9$ | −49.308 | $D_9$ | 1.40 | $N_5$ | 1.78800 | $\nu_5$ | 47.4 |
| $R_{10}$ | 35.107 | $D_{10}$ | 5.75 | $N_6$ | 1.84666 | $\nu_6$ | 23.9 |
| $R_{11}$ | −16518.160 | $D_{11}$ | variable (35.03 ~ 3.20) | | | | |
| $R_{12}$ | 94.828 | $D_{12}$ | 1.40 | $N_7$ | 1.63980 | $\nu_7$ | 34.5 |
| $R_{13}$ | 28.555 | $D_{13}$ | 10.46 | $N_8$ | 1.49700 | $\nu_8$ | 81.3 |
| $R_{14}$ | −85.070 | $D_{14}$ | 0.10 | | | | |
| $R_{15}$ | 28.669 | $D_{15}$ | 7.54 | $N_9$ | 1.68100 | $\nu_9$ | 63.4 |
| $R_{16}$ | 91.643 | $D_{16}$ | 0.20 | | | | |
| $R_{17}$ | 55.099 | $D_{17}$ | 2.86 | $N_{10}$ | 1.64000 | $\nu_{10}$ | 60.1 |
| $R_{18}$ | 74.395 | $D_{18}$ | 3.48 | | | | |
| $R_{19}$ | −297.878 | $D_{19}$ | 1.80 | $N_{11}$ | 1.84666 | $\nu_{11}$ | 23.9 |
| $R_{20}$ | 509.166 | $D_{20}$ | 23.62 | | | | |
| $R_{21}$ | 45.494 | $D_{21}$ | 4.34 | $N_{12}$ | 1.83400 | $\nu_{12}$ | 37.2 |
| $R_{22}$ | −138.486 | $D_{22}$ | 2.38 | | | | |
| $R_{23}$ | −27.219 | $D_{23}$ | 1.50 | $N_{13}$ | 1.88300 | $\nu_{13}$ | 40.8 |
| $R_{24}$ | 334.498 | | | | | | |

| | | | | |
|---|---|---|---|---|
| f | 51.92 | 74.68 | 128.04 | 194.16 |
| $D_6$ | 4.26 | 19.92 | 35.67 | 46.26 |
| $D_{11}$ | 35.03 | 25.25 | 12.05 | 3.20 |

$f_1 = 2.77 F_s$  $|f_2| = 0.73 F_s$
$f_3 = 0.76 F_s$  $N_L = 1.88300$ where f is the overall focal length, $R_i$ is the radius of curvature of the i-th lens surface, $D_i$ is the lens surface interval or lens thickness of the i-th lens surface, $N_i$ is the refractive index of the i-th lens at the d-line, and $\nu_i$ is the Abbe number of the i-th lens.

5. The zoom lens of any one of claims 1–3 wherein said first and second convergent lens groups are rigidly coupled mechanically to be movable together.

6. The zoom lens of claim 4 wherein said first and second convergent lens groups are mechanically movable independently of one another.

* * * * *